(12) United States Patent
Ding et al.

(10) Patent No.: US 11,890,956 B2
(45) Date of Patent: Feb. 6, 2024

(54) THERMAL MANAGEMENT OF VEHICLE SYSTEMS USING THERMAL ENERGY STORAGE ON THE VEHICLE

(71) Applicant: The University of Birmingham, Birmingham (GB)

(72) Inventors: Yulong Ding, Birminghamd (GB); Hui Cao, Birmingham (GB); Yanqi Zhao, Birmingham (GB); Binjian Nie, Birmingham (GB)

(73) Assignee: THE UNIVERSITY OF BIRMINGHAM, Birmingham (GB)

( * ) Notice: Subject to any disclaimer, the term of this patent is extended or adjusted under 35 U.S.C. 154(b) by 246 days.

(21) Appl. No.: 16/971,554

(22) PCT Filed: Feb. 21, 2019

(86) PCT No.: PCT/GB2019/050483
§ 371 (c)(1),
(2) Date: Aug. 20, 2020

(87) PCT Pub. No.: WO2019/162680
PCT Pub. Date: Aug. 29, 2019

(65) Prior Publication Data
US 2020/0391603 A1    Dec. 17, 2020

(30) Foreign Application Priority Data
Feb. 21, 2018   (GB) .................................. 1802814

(51) Int. Cl.
B60L 53/302   (2019.01)
B60L 53/50    (2019.01)
(Continued)

(52) U.S. Cl.
CPC ............. B60L 53/302 (2019.02); B60L 50/60 (2019.02); B60L 53/305 (2019.02); B60L 53/50 (2019.02);
(Continued)

(58) Field of Classification Search
CPC ...................................................... B60L 53/302
(Continued)

(56) References Cited

U.S. PATENT DOCUMENTS 9,389,007 B1    7/2016  McKay
2012/0327596 A1*  12/2012  Anderson-Straley ....................... H01M 10/625
361/689

(Continued)

FOREIGN PATENT DOCUMENTS

| CN | 103133071 A | 6/2013 |
|---|---|---|
| CN | 105958155 A | 9/2016 |

(Continued)

OTHER PUBLICATIONS

English-language abstract of JP2008265664A.
(Continued)

*Primary Examiner* — Jerry D Robbins
(74) *Attorney, Agent, or Firm* — Caesar Rivise, PC (57) ABSTRACT

Disclosed is a vehicle charging station (1) comprising a first reservoir (5) arranged to contain a first charging fluid and a charging fluid delivery system (3) arranged to deliver at least part of the first charging fluid (5) into a heat exchange relationship with a vehicle thermal energy storage material (108) of a vehicle (100) selectively connected to the vehicle charging station (1), thereby charging the vehicle thermal energy storage material (108) by changing its temperature and/or phase and/or chemistry.

20 Claims, 4 Drawing Sheets

(51) Int. Cl.
  *B60L 50/60* (2019.01)
  *B60L 53/64* (2019.01)
  *B60L 58/24* (2019.01)
  *B60L 53/30* (2019.01)
  *B60K 6/28* (2007.10)

(52) U.S. Cl.
  CPC ............... *B60L 53/64* (2019.02); *B60L 58/24* (2019.02); *B60K 6/28* (2013.01); *B60L 2240/34* (2013.01); *B60L 2240/545* (2013.01); *B60L 2270/44* (2013.01); *B60Y 2200/91* (2013.01); *B60Y 2200/92* (2013.01); *B60Y 2300/91* (2013.01)

(58) Field of Classification Search
  USPC ......................................................... 320/109
  See application file for complete search history.

(56) References Cited

U.S. PATENT DOCUMENTS

| | | | |
|---|---|---|---|
| 2014/0193683 A1* | 7/2014 | Mardall | B60K 1/04 429/99 |
| 2014/0208789 A1* | 7/2014 | Lombardo | B60H 1/00278 62/238.1 |
| 2015/0054450 A1 | 2/2015 | Chen et al. | |
| 2015/0054460 A1* | 2/2015 | Epstein | B60L 58/27 320/109 |
| 2015/0288317 A1* | 10/2015 | Huang | H02S 10/40 307/26 |
| 2015/0306974 A1* | 10/2015 | Mardall | H01M 10/625 429/120 |
| 2015/0316301 A1 | 11/2015 | Kolda et al. | |
| 2016/0079783 A1* | 3/2016 | Phan | H02J 7/0069 320/101 |
| 2016/0250906 A1* | 9/2016 | Xia | B60H 1/143 165/202 |
| 2017/0088007 A1* | 3/2017 | Melendez | B60L 53/302 |
| 2017/0174086 A1* | 6/2017 | van de Loo | H02K 7/1815 |
| 2017/0232865 A1* | 8/2017 | Christen | B60H 1/00278 429/120 |
| 2019/0202302 A1* | 7/2019 | Turik | B60L 53/18 |
| 2019/0299812 A1* | 10/2019 | Du | H01M 10/6567 |

FOREIGN PATENT DOCUMENTS

| | | |
|---|---|---|
| CN | 107054120 A | 8/2017 |
| CN | 206541905 U | 10/2017 |
| CN | 207015112 U | 2/2018 |
| EP | 3061635 A1 | 8/2016 |
| JP | H03207974 A | 9/1991 |
| JP | 2008265664 A | 11/2008 |

OTHER PUBLICATIONS

International Search Report and Written Opinion for PCT/GB2019/050483, dated May 22, 2019.
GB Search Report for GB 1802814.2 dated Jul. 23, 2018.
English Machine Translation of CN 207015112.
English Machine Translation of JP H03207974.
European Examination Report relating to EP Application No. 19 708 632.5 dated Jun. 14, 2022.
English translation of CN103133071A.
English translation of CN107054120A.
English translation of Office Action and Search Report in corresponding Chinese application dated Dec. 13, 2022.
English abstract for CN 105958155 A (2016).
English abstract for CN 206541905 U (2017).
Office Action relating to CN Patent Application No. 201980020914.5 dated Aug. 31, 2023.
English Translation of Office Action relating to CN Patent Application No. 201980020914.5 dated Aug. 31, 2023.

* cited by examiner

THERMAL MANAGEMENT OF VEHICLE SYSTEMS USING THERMAL ENERGY STORAGE ON THE VEHICLE

CROSS-REFERENCE TO RELATED APPLICATIONS

This application is a U.S. National Phase Application of PCT/GB2019/050483, filed Feb. 21, 2019, which claims priority to GB 1802814.2, filed Feb. 21, 2018, the contents of which applications are incorporated herein by reference in their entireties for all purposes.

TECHNICAL FIELD

The present disclosure concerns vehicle charging. Aspects of the invention concern vehicle charging stations, vehicles, vehicle charging methods, control systems, methods of control, computer programs, computer readable storage mediums and signals.

BACKGROUND

For simplicity the following background is provided making reference to electric and hybrid cars. This is not however intended to be limiting and it will be appreciated that the disclosures herein may also be relevant to other vehicles, be they road and/or land vehicles or not. The disclosures may for instance be applicable to electrical aircraft, boats or rail carriages.

Range extension for electric and hybrid electric cars when running on battery power is currently an ongoing challenge for the automotive sector. Aside from the battery drain caused by powering movement of the car, other car systems may also utilise the battery to supply power. By way of example, in some existing models, 30-40% of battery charge can be expended on cabin air conditioning. Another potential drain on battery energy are battery thermal management systems, which may draw power in order to keep the battery temperature within a range of operating temperatures. It is further noted that supporting infrastructure to deliver battery energy to such air conditioning and/or thermal management systems may occupy space within the car as well as adding weight.

In view of the above, key vehicle systems which are powered from a battery of a car also used to power movement of the car may significantly reduce performance (e.g. range and acceleration).

The search for solutions to this problem typically focuses on improved air conditioners and heating elements (e.g. use of a heat pump air conditioner or the use of new refrigerants such as $CO_2$). Whilst pursuit of these avenues has resulted in some improvement, a relatively large amount of battery charge is still expended by such systems. Further, these new technologies may also introduce new challenges. By way of example, a heat pump air conditioner may be prone to causing condensation on a windscreen and/or reduced heating performance caused by frosting.

SUMMARY OF THE INVENTION

According to a first aspect of the invention, there is provided a vehicle charging station comprising a first reservoir arranged to contain a first charging fluid and a charging fluid delivery system arranged to deliver at least part of the first charging fluid into a heat exchange relationship with a vehicle thermal energy storage material of a vehicle selectively connected to the vehicle charging station, thereby charging the vehicle thermal energy storage material by changing its temperature and/or phase and/or chemistry.

The vehicle thermal energy storage material may act as a thermal energy store for use in vehicle systems e.g. for use in maintaining the temperature of a vehicle battery within a desired range of temperatures and/or for use in a heating, ventilation and cooling system of the vehicle in order to provide warmed and/or cooled air to a cabin. This may reduce the load on the vehicle battery, such as electrical energy from which might otherwise be used to manage the battery's own temperature and the temperature of the cabin. By charging the vehicle thermal energy storage material using heat exchange with the first charging fluid provided by the vehicle charging station, reduced cost may be achieved by comparison (for instance) with charging the vehicle thermal energy storage material directly using electrical energy. Specifically, the first reservoir may serve as a thermal energy store, which may, at least primarily, be heated/cooled at a time when energy is cheaper.

In some embodiments the heat exchange relationship is provided by a heat exchanger. The heat exchanger may be part of the vehicle charging station or part of the vehicle. Further, the heat exchanger may be formed, at least in part, by the vehicle thermal energy storage material.

In some embodiments the vehicle charging station comprises a thermal energy change system arranged to alter and/or maintain at least one of the temperature, phase, or chemistry of the first charging fluid in the first reservoir and/or elsewhere in the vehicle charging station, where the thermal energy change system comprises at least one of a heating or cooling system. In this way, at least one of the temperature, phase, or chemistry of the first charging fluid may be managed whilst it is stored in the vehicle charging station. This may eliminate the need for the first charging fluid to be replaced at regular intervals and/or delivered to the vehicle charging station at a particular temperature or in a particular phase.

In some embodiments the thermal energy change system is arranged to convert electrical energy to thermal energy. The thermal energy change system may for instance comprise at least one of an air conditioning unit arranged to cool the first charging fluid or an electrical heating element arranged to heat the first charging fluid.

In some embodiments the thermal energy change system is arranged to receive the electrical energy from a power grid. This may be a convenient way of providing an abundant and readily available supply of electrical power to the thermal energy change system. Where there are a sufficient number of vehicle charging stations connected to the grid, and they preferentially draw electrical energy at off-peak times, they may contribute to grid power peak shaving and balancing.

In some embodiments the thermal energy change system is arranged to receive the electrical energy via a transformer and the vehicle charging station is arranged to recover thermal energy produced by use of the transformer and at least one of maintain or adjust at least one of the temperature, phase, or chemistry of the first charging fluid using the recovered thermal energy.

This may improve the efficiency of the process of adjusting at least one of the temperature, phase, or chemistry of the first charging fluid.

In some embodiments the thermal energy change system is arranged to deliver thermal energy to the first charging fluid where the thermal energy is provided by at least one of the surroundings, by one or more renewable energy sources, or by waste thermal energy from one or more processes. This may improve the efficiency of the process of adjusting at least one of the temperature, phase, or chemistry of the first charging fluid. Renewable energy could for instance come from solar photovoltaic cells or solar thermal collectors. Waste thermal energy may come from other industrial/commercial processes (e.g. nuclear power generation).

In some embodiments the thermal energy change system is arranged to harvest the thermal energy provided from at least one of the surroundings or the waste thermal energy from one or more processes.

In some embodiments the thermal energy change system is arranged to selectively convert thermal energy from the first charging fluid to electrical energy and deliver it to the energy grid. The thermal energy change system could for instance comprise a Peltier element or a thermoelectric element. This functionality may reduce wastage and cost where for instance a steady reduction in the thermal energy of the first charging fluid is desired (e.g. due to a reduction in load and/or an anticipated change in the desirable temperature of the first charging fluid due to variation in ambient conditions).

In some embodiments the vehicle charging station comprises a control system arranged to control the thermal energy change system to at least one of maintain or adjust at least one of the temperature, phase, or chemistry of the first charging fluid. As will be appreciated, the control system may also be arranged to control delivery by the thermal energy change system of electrical energy to the energy grid, where this functionality is provided.

In some embodiments the control system is arranged to control the thermal energy change system to at least one of maintain or adjust at least one of the temperature, phase, or chemistry of the first charging fluid in dependence on one or more operation parameters. Examples of operation parameters that may be used in isolation or in combination are:

Status of the first charging fluid, e.g., its temperature, phase, volume, pressure etc.

Ambient temperature and/or other weather conditions, e.g., at the vehicle charging station and/or within a particular area.

Predicted future ambient temperature and/or other weather conditions, e.g., at the vehicle charging station and/or within a particular area. Relevant weather conditions may include wind and precipitation levels (e.g. rain or snow).

Current and/or predicted load, e.g., number of vehicles or thermal energy discharge per time period.

Time of day, e.g., rush-hour, off-peak electricity period etc.

Cost associated with at least one of maintaining or adjusting at least one of the temperature, phase, or chemistry of the first charging fluid at that and/or other times, e.g., the cost of electricity at the relevant time or the availability of waste thermal energy at the relevant time.

Traffic conditions at a location or within a region, e.g., how this might affect demand.

The status of one or more systems of one or more vehicles, e.g., remaining thermal energy stored in the at least one of vehicle thermal energy storage material, battery state of charge, or demand of at least one of temperature, heating, ventilation and cooling, etc.

The status of one or more additional vehicle charging stations, e.g., the temperature of the first charging fluid stored therein and/or the remaining thermal energy stored therein.

A facility may also be provided to automatically or manually override normal control in order to maintain or adjust at least one of the temperature, phase, or chemistry of the first charging fluid as desired.

The use of such operation parameters may allow optimisation when at least one of maintaining or adjusting at least one of the temperature, phase, or chemistry in terms of reduced cost, increasing the likelihood that demand is met and providing appropriate thermal control to vehicles. By way of example, depending on factors such as ambient temperature and other weather conditions, vehicle system demand for cooling and heating respectively may vary. Thus, the control system may respond to at least one of ambient temperature and other weather conditions, predicted future ambient temperature, or other weather conditions as input operation parameters and adjust the temperature of the first charging fluid. The temperature of the first charging fluid may for instance be adjusted to thermal comfort level for humans. By way of alternative example, where local traffic conditions, e.g., congestion, traffic jams or accidents, mean that a particular vehicle charging station is likely to or is receiving higher demand than normal for charging, the control system may operate the thermal energy change system to increase, maintain, or slow the reduction in the thermal energy stored in the first charging fluid.

In some embodiments the control system exclusively or preferentially at least one of maintains or alters at least one of the temperature, phase, or chemistry of the first charging fluid during times of day where electricity is cheaper. Thus, heating and/or cooling of the first charging fluid may only, or preferentially, occur at off-peak times (e.g. at night-time). This may reduce cost and assist with grid load balancing and time shifting. At least one of maintaining or altering at least one of the temperature, phase, or chemistry of the first charging fluid may however be performed at peak times where not doing so would breach a predetermined threshold of one or more parameters indicative of a degree of compromise in the capability of the vehicle charging system (or a network of such vehicle charging systems) to meet demand.

In some embodiments the vehicle charging station is arranged to store and deliver first charging fluid having a higher temperature than a design operation temperature for the vehicle thermal energy storage material. Due to greater disparity in the temperatures of the first charging fluid and the vehicle thermal energy storage material, charging more rapidly may be possible due to a higher driving force for the heat transfer. Similarly, the vehicle charging station may be arranged to store and deliver the first charging fluid having a lower temperature than a design operation temperature for the vehicle thermal energy storage material.

In some embodiments the first reservoir may be arranged to contain approximately at least litres of first charging fluid.

In some embodiments the first reservoir comprises a storage vessel located at least partially below ground. Storing the first charging fluid at least partially below ground serves to better insulate it against temperature change. In certain examples, the storage vessel is a re-purposed fuel storage tank, for instance, associated with a fuel station forecourt.

In some embodiments the vehicle charging station comprises an electrical charging system arranged to deliver electrical energy to a vehicle electrical system. The electrical charging system may be used to deliver electrical energy to one or more batteries of the vehicle and, in particular, to batteries used to power movement of the vehicle. The vehicle charging station may be arranged to supply electrical energy via the electrical charging system and to charge the vehicle thermal energy storage material via the charging fluid delivery system simultaneously. In certain examples, the vehicle charging system and the charging delivery system comprise independent connectors for connection with the vehicle, while in other examples they may be combined into a shared connector.

In some embodiments the first charging fluid comprises a phase change material. The first charging fluid could for example comprise mineral or synthetic oil, molten salts, water, or ethylene glycol mixture, optionally with phase change materials suspended in the fluid. In certain examples, the first charging fluid is therefore capable of absorbing and releasing latent heat at melting and solidifying temperatures of the phase change material. In certain examples, the first charging fluid further comprises one or more thermally conductive additives to improve thermal conduction. The thermally conductive additives may be organic materials, inorganic materials, composite organic-inorganic materials, or metals and alloys e.g. graphite, graphene, expandable graphite, carbon fibre, carbon nanotubes, aluminium, aluminium oxide, copper or copper oxide. The first charging fluid may have a design operating temperature as low as of −30° C. or less and a design operating temperature as high as 300° C. or more.

In some embodiments the vehicle charging station comprises a communication controller arranged to communicate directly or indirectly via one or more wired or wireless networks with one or more devices. Each device may be a central data storage repository, a central controller, another vehicle charging station, a vehicle, or another user device such as a mobile phone. The device may be remote from the communication controller or the vehicle charging station. Where the device is a central controller, the central controller may form part of another device or may stand-alone. The communication controller may allow the vehicle charging station to at least one of send information concerning (for instance) its status, receive information concerning the status of other devices, or receive instructions for managing its own status. By way of an example application, this allows a plurality of vehicle charging stations to manage themselves and/or be managed to cooperate in providing charging services. Thus, a vehicle charging station (a) might compensate for high load on another vehicle charging station (b), by increasing its own thermal energy reserves. Vehicles might then be directed (e.g. by navigation systems) preferentially to the vehicle charging station (a), potentially allowing vehicle charging station (b) to recover its own thermal energy reserves. One or more of the communication controllers and/or the one or more devices may be arranged to aggregate data communicated thereto and/or therefrom. As will be appreciated the data may concern operation of at least one of the vehicle charging station or the one or more devices.

In some embodiments the communication controller is arranged to send one or more operation parameters concerning the vehicle charging station to the one or more devices via the one or more wired or wireless networks. The operation parameters may for example be indicative of one or more of:

The status of the first charging fluid, e.g., its temperature, phase, volume, etc.
    Ambient temperature and/or other weather conditions, e.g., at the vehicle charging station or within a particular area.
    Predicted future ambient temperature and/or other weather conditions, e.g., at the vehicle charging station or within a particular area.
    Current and/or predicted load, e.g., number of vehicles or thermal energy discharge per time period.
    Time of day, e.g., rush-hour, off-peak electricity period etc.
    Cost associated with at least one of maintaining or adjusting the temperature, phase, or chemistry of the first charging fluid at that and/or other times, e.g., at least one of the cost of electricity at the relevant time or the availability of waste thermal energy at the relevant time.
    Traffic conditions at a location or within a region, e.g., how this might affect demand.
    The status of one or more systems of one or more vehicles, e.g., remaining thermal energy stored in the vehicle thermal energy storage material, battery state of charge and/or temperature, heating, ventilation and cooling demand etc.
    The status of one or more additional vehicle charging stations, e.g., the temperature of the first charging fluid stored therein and/or the remaining thermal energy stored therein.

In some embodiments the communication controller is arranged to receive one or more operation parameters concerning one or more other vehicle charging stations from the one or more devices, via one or more wired or wireless networks. The one or more wired or wireless networks may be the same as those used to send operation parameters concerning the vehicle charging station, where such a network or networks are provided. The received operation parameters may be as per that described above with reference to operation parameters which may be sent from the vehicle charging station, only with respect to the one or more other vehicle charging stations.

In some embodiments the communication controller is arranged to receive operating instructions from the one or more devices, via one or more wired or wireless networks. The one or more wired or wireless networks may be the same as those used to send operation parameters concerning the vehicle charging station and/or to receive operation parameters concerning the one or more other vehicle charging stations, where such a network or networks are provided. The operating instructions may have been generated by the one or more devices. The operating instructions may depend on operation parameters for one, some, or all of the devices connected thereto by wired or wireless link. The operating instructions may concern the operation of the thermal energy change system (e.g. at least one of a desired temperature, phase, or chemistry for the first charging fluid).

In some embodiments the control system may be arranged to receive at least one of the one or more operation parameters and operating instructions received by the communication controller and control operation of the vehicle charging station in dependence on those operation parameters and those operating instructions. It may be for instance that the control system controls operation of the thermal energy change system (e.g. to achieve at least one of a desired temperature, phase, or chemistry for the first charging fluid) in dependence on those operation parameters and those operating instructions.

In some embodiments the communication controller is arranged to send operating instructions to the one or more devices, via one or more wired or wireless networks. The one or more wired or wireless networks may be the same as those used to send operation parameters concerning the vehicle charging station and/or to receive operation parameters concerning the one or more devices, where such a network or networks are provided. In certain examples, the operating instructions are generated by the communication controller or the control system. The operating instructions may depend on operation parameters for one, some, or all of the devices connected thereto by wired or wireless link. The operating instructions may concern operation of one or more of the devices. The operating instructions could for instance be for control of the thermal energy change system of one or more other vehicle charging stations.

In some embodiments the communication controller may form part of the control system.

In some embodiments the vehicle charging station comprises a second reservoir arranged to contain a second charging fluid, whereby the first and second charging fluids are maintained at at least one of substantially different temperatures or phases and where the charging fluid delivery system is arranged to allow selection between delivery of the first and second charging fluids into heat exchange relationship with the vehicle thermal energy storage material. In this way charging fluid better suited to different ambient temperatures and/or other weather conditions and vehicle system requirements can be provided without significant delay between charging cycles and inefficient changes being made to the temperature, phase, or chemistry of the first charging fluid. Additionally, or alternatively, the second charging fluid may be provided for an alternative charging function, e.g., charging a refrigeration vehicle or refrigeration transportation vehicle. It may be for example that one of the first charging fluid and the second charging fluid is maintained at a temperature above ambient and the other at a temperature below it.

It is to be understood that any feature or relationship described previously with reference or respect to the first reservoir and/or first charging fluid may also apply to the second reservoir and/or second charging fluid and relationships therewith mutatis mutandis. Further such features or relationships may be duplicated, one applying to each of the relevant reservoir and/or charging fluid, or where appropriate, the same feature or relationship may apply to both of the relevant reservoir and charging fluid. Thus, by way of example, the thermal energy change system may be arranged to at least one of alter or maintain the temperature, phase, or chemistry of the second charging fluid in the second reservoir or elsewhere in the vehicle charging station. Alternatively, an additional thermal energy change system may be provided, arranged to at least one of alter or maintain at least one of the temperature, phase, or chemistry of the second charging fluid in the second reservoir or elsewhere in the vehicle charging station.

Selection between delivery of the first or second charging fluid may be made automatically or manually in response to one or more operation parameters. The control system may select between delivery of the first and second charging fluid. Example parameters are:

Status of the first and/or second charging fluids, e.g., temperature, phase, volume, etc.

Ambient temperature and/or other weather conditions, e.g., at the vehicle charging station and/or within a particular area.

Predicted future ambient temperature and/or other weather conditions, e.g., at the vehicle charging station and/or within a particular area.

The status of one or more systems of one or more vehicles, e.g., remaining thermal energy stored in the vehicle thermal energy storage material, battery state of charge, heating, ventilation, and cooling demand, etc.

According to a second aspect of the invention there is provided a vehicle comprising a thermal management system, the thermal management system comprising a vehicle thermal energy storage material and being arranged to place the vehicle thermal energy storage material and a first charging fluid of a vehicle charging station selectively connected with the vehicle into a heat exchange relationship with each other, the first charging fluid thereby charging the vehicle thermal energy storage material by changing at least one of its temperature, phase, or chemistry.

In some embodiments the vehicle thermal energy storage material is at least in part provided in, on and/or as part of an interior vehicle feature such as a vehicle seating structure. By way of example at least part of the vehicle thermal energy storage material may be provided in, on and/or as part of at least one of a seat cushion, seat back, or a head rest. Materials of the interior vehicle feature (e.g., cushioning such as foam) may serve to insulate the vehicle thermal energy storage material against temperature change.

In some embodiments the vehicle thermal energy storage material is at least in part provided in, on and/or as part of a body of the vehicle. It may be for instance that at least part of the vehicle thermal energy storage material is provided in, on and/or as part of at least one of a rocker panel, A-pillar, B-pillar, C-pillar, or D-pillar of the vehicle. The vehicle thermal energy storage material may provide structural reinforcement to structural body components or the body in general.

In some embodiments the heat exchange relationship is provided by a heat exchanger. The heat exchanger may be part of the vehicle charging station or part of the vehicle. Further the heat exchanger may be formed, at least in part, by the vehicle thermal energy storage material.

In some embodiments the thermal management system is arranged to provide for thermal energy transfer between the vehicle thermal energy storage material and a battery temperature control system arranged to maintain the temperature of a battery of the vehicle within a temperature tolerance range using thermal energy transfer with the vehicle thermal energy storage material. Using the vehicle thermal energy storage material to manage the battery temperature may reduce the load on the battery, electrical energy from which might otherwise be used to manage its own temperature.

In some embodiments the battery is arranged to deliver energy to propel the vehicle. In other words, the vehicle may be an electric or hybrid electric vehicle. The vehicle may comprise an electrical charging system for charging the battery from at least one of a supply external to the vehicle or from vehicle systems such as an engine or braking system.

In some embodiments the thermal management system is arranged to provide for thermal energy transfer between ambient air and the battery temperature control system. Under certain operating conditions it may be that heat exchange with the vehicle thermal energy storage material would tend to heat the battery when it is already too hot or cool the battery when it is already too cold. Thus, where ambient air is better suited to modifying the battery temperature in a desired direction, the thermal management system may selectively provide for heat exchange with the ambient air in preference to heat exchange with the vehicle thermal energy storage material. As will be appreciated, heat exchange with ambient air may be accomplished by (for instance) use of an air scoop and valved conduit system for selectively delivering ambient air to and away from a heat exchange relationship with the battery.

In some embodiments the thermal management system is arranged to provide for thermal energy transfer between the vehicle thermal energy storage material and a temperature conditioning system arranged to selectively deliver heating and/or cooling to a cabin of the vehicle using thermal energy transfer with the vehicle thermal energy storage material. Using the vehicle thermal energy storage material to respond to cabin heating and/or cooling demands may reduce the load on the battery, electrical energy from which might otherwise be used to manage the temperature of the cabin.

In some embodiments the vehicle does not comprise a refrigeration cycle system arranged to deliver cooling to a cabin or arranged to cool the battery of the vehicle. The provision of the thermal management system may negate the need for such a refrigeration cycle system.

In some embodiments the vehicle does not comprise electrically powered heating elements arranged to produce heat for use in delivering heating to a cabin and/or heating a battery of the vehicle. The provision of the thermal management system may negate the need for such electrically powered heating elements.

In some embodiments the vehicle comprises a control system arranged to control the thermal management system transfer of thermal energy between the vehicle thermal energy storage material and at least one of the battery temperature control system or the temperature conditioning system. The control system may control such operations in accordance with factors including but not limited to the respective demands from each of the battery temperature control system and temperature conditioning system, the relative importance of those systems, the importance and/or urgency of their demands, the remaining thermal energy stored in the vehicle thermal energy storage material, and the availability and suitability of alternative measures to mitigate full or partial failure to meet the demands.

In some embodiments the control system is arranged to control the thermal management system placing of the vehicle thermal energy storage material and the first charging fluid of the vehicle charging station selectively connected with the vehicle into the heat exchange relationship with each other.

In some embodiments the thermal management system is arranged to place the vehicle thermal energy storage material and a second charging fluid of the vehicle charging station to which the vehicle is selectively connected into a heat exchange relationship with each other, the second charging fluid thereby charging the vehicle thermal energy storage material by changing at least one of its temperature, phase, or chemistry. The first and second charging fluids may be maintained at substantially different temperatures, phases, and/or chemical states. It may be for example that one of the first charging fluid or the second charging fluid is maintained at a temperature above ambient and the other at a temperature below it. The thermal management system may be arranged to allow selection between heat exchange between the first charging fluid and the vehicle thermal energy storage material and between the second charging fluid and the vehicle thermal energy storage material. The thermal management system may be adapted to accommodate the vehicle thermal energy storage material where it has been in heat exchange with either of the first and second charging fluids.

It is to be understood that any feature or relationship described previously with reference or respect to the first charging fluid may also apply to the second reservoir and/or second charging fluid and relationships therewith mutatis mutandis.

Selection between heat exchange with the first or second charging fluid may be made automatically or manually in response to one or more operation parameters. The control system may select between the first and second charging fluid. Example operation parameters are:

Status of the first and/or second charging fluids, e.g., temperature, phase, volume, etc.

Ambient temperature and/or other weather conditions, e.g., at the vehicle charging station or within a particular area.

Predicted future ambient temperature and/or other weather conditions, e.g., at the vehicle charging station and/or within a particular area.

The status of one or more systems of the vehicle, e.g., remaining thermal energy stored in the vehicle thermal energy storage material, battery state of charge, heating, ventilation, and cooling demand etc.

In some embodiments the vehicle thermal energy storage material comprises a phase change material or thermochemical storage material. The vehicle thermal energy storage material may be solid, liquid or gas during normal operation of the vehicle or may change between two or more of these phases during normal operation of the vehicle. The vehicle thermal energy storage material may be adapted using one or more heat transfer enhancement measures, e.g., having at least one of fins, thermally conductive additives, or metal foams to improve thermal conduction. The thermally conductive additives may be organic materials, inorganic materials, composite organic-inorganic materials, or metals and alloys e.g., graphite, graphene, expandable graphite, carbon fibre carbon nanotubes, aluminium, aluminium oxide, copper, or copper oxide. The fins or foams may be made of copper, aluminium, steel, or carbon fibres. The phase change material may have a melting point between 30° C. (or lower) and +300° C. (or higher). In some embodiments the vehicle thermal energy storage material may be stored in the vehicle at temperatures of the order of 700° C. Examples of potentially suitable phase change materials are chloride salts, carbonate salts, sulphate salts and nitrate salts, a combination of two or more of these, or a higher alkane, a polymer, a polyol, or eutectic salt solution. The vehicle thermal energy storage material may comprise a plurality of such phase change materials. The different phase change materials may differ in their properties. Examples of potentially suitable thermochemical storage materials would facilitate calcination/carbonation of carbonate salt reactions, hydration/dehydration of metal hydroxide reactions, hydration/dehydration of hydrated salt reactions or oxidation/decomposition of metal peroxide reaction.

In some embodiments the vehicle comprises a communication controller arranged to communicate directly or indirectly via one or more wired or wireless networks with one or more devices. Each device may be a central controller, another vehicle, a vehicle charging station or another user device such as a mobile phone. The device may be remote from the communication controller and/or the vehicle. Where the device is a central controller, the central controller may form part of another device or may standalone. In certain examples, the communication controller allows the vehicle to send information concerning (for instance) at least one of its status, the status of other devices, or receive instructions for managing its own status. By way of an example application, this may allow a vehicle to recommend a particular vehicle charging station based for instance on the status by comparison with other vehicle charging stations (e.g., the condition of their respective thermal energy stores). Factors such as ambient conditions and/or other weather conditions, the status of the vehicle thermal energy store road and/or traffic conditions, or the distance to the respective vehicle charging stations and the convenience of their locations in terms of a particular journey plan might also be addressed in determining the recommendation. Any recommendation may be notified to a user, e.g., as a proposed route on navigation display. One or more of the communication controller and the one or more devices may be arranged to aggregate data communicated thereto and/or therefrom. As will be appreciated the data may concern operation of the vehicle and/or the one or more devices.

In some embodiments the communication controller is arranged to send one or more operation parameters concerning the vehicle to the one or more devices via the one or more wired or wireless networks. The operation parameters may for example be indicative of one or more of:

Ambient temperature and/or other weather conditions, e.g., at the location of the vehicle and/or within a particular area.

Predicted future ambient temperature and/or other weather conditions, e.g., at the location of the vehicle and/or within a particular area.

Time of day, e.g., rush-hour.

Traffic conditions at a location and/or within a region.

The status of one or more systems of the vehicle. e.g., remaining thermal energy stored in the vehicle thermal energy storage material, battery state of charge and/or temperature, heating, ventilation, and cooling demand etc.

In some embodiments the communication controller is arranged to receive one or more operation parameters concerning one or more vehicle charging stations from the one or more devices, via one or more wired or wireless networks. The one or more wired or wireless networks may be the same as those used to send operation parameters concerning the vehicle, where such a network or networks are provided. The received operation parameters for each vehicle charging station may for example be indicative of one or more of:

The status of the first and/or second charging fluid, e.g., its temperature, phase, volume, etc.

Ambient temperature and/or other weather conditions, e.g., at the vehicle charging station and/or within a particular area.

Predicted future ambient temperature and/or other weather conditions, e.g., at the vehicle charging station and/or within a particular area.

Current and/or predicted load, e.g., number of vehicles and/or thermal energy discharge per time period.

Time of day, e.g., rush-hour, off-peak electricity period etc.

Cost associated with maintaining and/or adjusting at least one of the temperature, phase, or chemistry of the first charging fluid at that and/or other times, e.g., the cost of electricity at the relevant time and/or the availability of waste thermal energy at the relevant time.

Traffic and/or road conditions at a location and/or within a region, e.g., how this might affect demand.

The status of one or more additional vehicle charging stations, e.g., the temperature of the first charging fluid stored therein and/or the remaining thermal energy stored therein.

In some embodiments the communication controller is arranged to receive operating instructions from the one or more devices, via one or more wired or wireless networks. The one or more wired or wireless networks may be the same as those used to send operation parameters concerning the vehicle and/or to receive operation parameters concerning the one or more vehicle charging stations, where such a network or networks are provided. The operating instructions may have been generated by the one or more devices. The operating instructions may depend on operation parameters for one, some or all of the devices connected thereto by wired or wireless link. The operating instructions may concern one or more vehicle charging stations that may be used for charging.

In some embodiments the control system may be arranged to receive the operation parameters and/or operating instructions received by the communication controller and control operation of the vehicle in dependence on those operation parameters and/or those operating instructions. It may be for instance that the control system controls operation of a navigation system of the vehicle to direct a user of the vehicle to an appropriate vehicle charging station from among one or more vehicle charging stations which might be selected.

In some embodiments the communication controller is arranged to send operating instructions to the one or more devices, via one or more wired or wireless networks. The one or more wired or wireless networks may be the same as those used to send operation parameters concerning the vehicle and/or to receive operation parameters concerning the one or more devices, where such a network or networks are provided. The operating instructions may have been generated by the communication controller and/or the control system. The operating instructions may depend on operation parameters for one, some or all of the devices connected thereto by wired or wireless link. The operating instructions may concern operation of one or more of the devices. The operating instructions could for instance be for control of the thermal energy change system of one or more vehicle charging stations.

In some embodiments the communication controller may form part of the control system.

According to a third aspect of the invention there is provided a vehicle charging method comprising charging a vehicle thermal energy storage material of a vehicle selectively connected to a vehicle charging station by delivering at least part of a first charging fluid contained in the vehicle charging station into a heat exchange relationship with the vehicle thermal energy storage material, thereby changing the temperature and/or phase and/or chemistry of the vehicle thermal energy storage material.

In some embodiments the method comprises at least one of heating or cooling the first charging fluid in the vehicle charging station thereby at least one of altering or maintaining at least one of its temperature, phase, or chemistry.

In some embodiments maintenance and/or adjustment to at least one of the temperature, phase, or chemistry of the first charging fluid is made in dependence on one or more operation parameters. Examples of operation parameters that may be used in isolation or in combination are:

Status of the first charging fluid, e.g., its temperature, phase, volume, etc.

Ambient temperature and/or other weather conditions, e.g., at the vehicle charging station and/or within a particular area.

Predicted future ambient temperature and/or other weather conditions, e.g., at the vehicle charging station and/or within a particular area.

Current and/or predicted load, e.g., number of vehicles and/or thermal energy discharge per time period.

Time of day, e.g., rush-hour, off-peak electricity period etc.

Cost associated with at least one of maintaining or adjusting at least one of the temperature, phase, or chemistry of the first charging fluid at that and/or other times, e.g., the cost of electricity at the relevant time and/or the availability of waste thermal energy at the relevant time.

Traffic and/or road conditions at a location or within a region, e.g., how this might affect demand.

The status of one or more systems of one or more vehicles, e.g., remaining thermal energy stored in the vehicle thermal energy storage material, battery state of charge, heating, ventilation and cooling demand, etc.

The status of one or more additional vehicle charging stations, e.g., the temperature of the first charging fluid stored therein and/or the remaining thermal energy stored therein.

A facility may also be provided to automatically or manually override normal control in order to maintain or adjust at least one of the temperature, phase, or chemistry of the first charging fluid as desired.

In some embodiments maintenance and/or alteration of at least one of the temperature, phase, or chemistry of the first charging fluid is exclusively or preferentially performed during times of day where electricity is cheaper.

In some embodiments the method further comprises delivering electrical energy to an electrical system of the vehicle.

In some embodiments the method comprises communicating directly or indirectly between the vehicle and/or vehicle charging station with one or more devices via one or more wired or wireless networks. Each device may be a central controller, another vehicle charging station, a vehicle, or another user device such as a mobile phone.

In some embodiments the method comprises charging the vehicle thermal energy storage material of the vehicle selectively connected to the vehicle charging station by delivering at least part of a second charging fluid contained in the vehicle charging station into a heat exchange relationship with the vehicle thermal energy storage material, thereby changing at least one of the temperature, phase, or chemistry of the vehicle thermal energy storage material.

The method may further comprise selection between delivery of the first and second charging fluids into heat exchange relationship with the vehicle thermal energy storage material. The first and second charging fluids may be maintained at substantially different temperatures and/or phases.

It is to be understood that any method step or relationship described previously with reference or respect to the first charging fluid may also apply to the second charging fluid and relationships therewith mutatis mutandis.

In some embodiments selection between delivery of the first or second charging fluid are made automatically or manually in response to one or more operation parameters. Example operation parameters are:

Status of the first and/or second charging fluids, e.g., temperature, phase, volume, etc.

Ambient temperature and/or other weather conditions, e.g., at the vehicle charging station and/or within a particular area.

Predicted future ambient temperature and/or other weather conditions, e.g., at the vehicle charging station and/or within a particular area.

The status of one or more systems of one or more vehicles, e.g., remaining thermal energy stored in the vehicle thermal energy storage material, battery state of charge, heating, ventilation, and cooling demand, etc.

According to a fourth aspect of the invention there is provided a computer program that, when read by a computer, causes performance of the method of the third aspect.

According to fifth aspect of the invention there is provided a non-transitory computer readable storage medium comprising computer readable instructions that, when read by a computer, cause performance of the method of the third aspect. The non-transitory computer readable storage medium may be, for example, a USB flash drive, a secure digital (SD) card, an optical disc (such as a compact disc (CD), a digital versatile disc (DVD) or a Blu-ray disc).

According to sixth aspect of the invention there is provided a signal comprising computer readable instructions that, when read by a computer, cause performance of the method of the third aspect.

According to a seventh aspect of the invention there is provided a control system arranged to perform the method of the third aspect.

According to an eighth aspect of the invention there is provided a control system arranged to analyse one or more operation parameters for at least one device, where each device is one or other of a vehicle charging station according to the first aspect and the vehicle of the second aspect and where the control system is further arranged to control operation of at least one vehicle charging station according to the first aspect and/or at least one vehicle according to the second aspect, the control depending on the analysis.

Examples of operation parameters that may be used in isolation or in combination and as appropriate to the device or devices are:

Status of the first and/or second charging fluid, e.g., temperature, phase, volume, etc.

Ambient temperature and/or other weather conditions, e.g., at the vehicle charging station or within a particular area.

Predicted future ambient temperature and/or other weather conditions, e.g., at the vehicle charging station and/or within a particular area.

Current and/or predicted load, e.g., number of vehicles or thermal energy discharge per time period.

Time of day, e.g., rush-hour, off-peak electricity period, etc.

Cost associated with at least one of maintaining or adjusting at least one of the temperature, phase, or chemistry of the first and/or second charging fluid at that and/or other times, e.g., the cost of electricity at the relevant time and/or the availability of waste thermal energy at the relevant time.

Traffic and/or road conditions at a location or within a region, e.g., how this might affect demand.

The status of one or more systems of one or more of the vehicles, e.g., remaining thermal energy stored in the vehicle thermal energy storage material, battery state of charge, heating, ventilation, and cooling demand etc.

The status of one or more additional vehicle charging stations, e.g., the temperature of at least one of the first charging fluid, the second charging fluid stored therein, or the remaining thermal energy stored therein.

A facility may also be provided to automatically or manually override normal control in order to maintain or adjust at least one of the temperature, phase, or chemistry of the first charging fluid as desired.

By way of example of the analysis that might be performed by the control system, the control system might determine an expected demand for a given time period for the first and/or second charging fluid from a particular vehicle charging station. This may depend, for instance, on at least one of current and forecast ambient temperature and/or other weather conditions for the region in which the vehicle charging station is located (i.e. whether demand is likely to be for above or below ambient temperature charging fluid and/or the rate at which vehicles are likely to consume thermal energy from their vehicle thermal energy storage material); average charging operations per time period for the vehicle charging station; and any factors likely to cause an anomaly in charging operations (e.g. one or more other local vehicle charging stations being inoperative, impacted by traffic congestion or low on thermal energy reserves). The control system may then determine whether the expected load (optionally with a predetermined margin) can be met given the current status of the vehicle charging station (i.e., temperature, phase, volume, etc. of the first and/or second charging fluid). Based on this determination the control system may decide on appropriate action. Appropriate action could for example be determining that the energy change system of the charging station should be operated to maintain and/or adjust the thermal energy of the first and/or second charging fluids and whether this can wait until it can be done more cheaply (e.g., off-peak electricity) or not. Additionally, or alternatively the control system may determine that vehicles should be preferentially directed to or away from the vehicle charging station for charging given its current and potential thermal energy reserves.

Examples of the control that may, as appropriate, be performed by the control system over operation of the at least one vehicle charging station according to the first aspect and/or the at least one vehicle according to the second aspect are:

- Control the thermal energy change system to maintain and/or adjust at least one of the temperature, phase, or chemistry of at least one of the first or second charging fluid in one or more of the vehicle charging stations.
- Control delivery by the thermal energy change system of electrical energy to the energy grid.
- Select between delivery of the first and second charging fluids.
- Control provision by the thermal management system of thermal energy transfer between the vehicle thermal energy storage material and the battery temperature control system and/or provision by the thermal management system of thermal energy transfer between the vehicle thermal energy storage material and the temperature conditioning system for one or more of the vehicles.

In some embodiments the control system may also be arranged to aggregate data communicated thereto and/or therefrom. As will be appreciated the data may concern operation of the one or more of the devices.

According to a ninth aspect of the invention there is provided a method of controlling operation of at least one vehicle charging station according to the first aspect and/or at least one vehicle according to the second aspect comprising analysing one or more operation parameters for at least one device, where each device is one or other of a vehicle charging station according to the first aspect and the vehicle of the second aspect, where the control depends on the analysis.

According to a tenth aspect of the invention there is provided a computer program that, when read by a computer, causes performance of the method of the ninth aspect.

According to an eleventh aspect of the invention there is provided a non-transitory computer readable storage medium comprising computer readable instructions that, when read by a computer, cause performance of the method of the ninth aspect. The non-transitory computer readable storage medium may be, for example, a USB flash drive, a secure digital (SD) card, an optical disc (such as a compact disc (CD), a digital versatile disc (DVD) or a Blu-ray disc).

According to a twelfth aspect of the invention there is provided a signal comprising computer readable instructions that, when read by a computer, cause performance of the method of the ninth aspect.

Within the scope of this application, it is expressly intended that the various aspects, embodiments, examples, and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Figure 1:
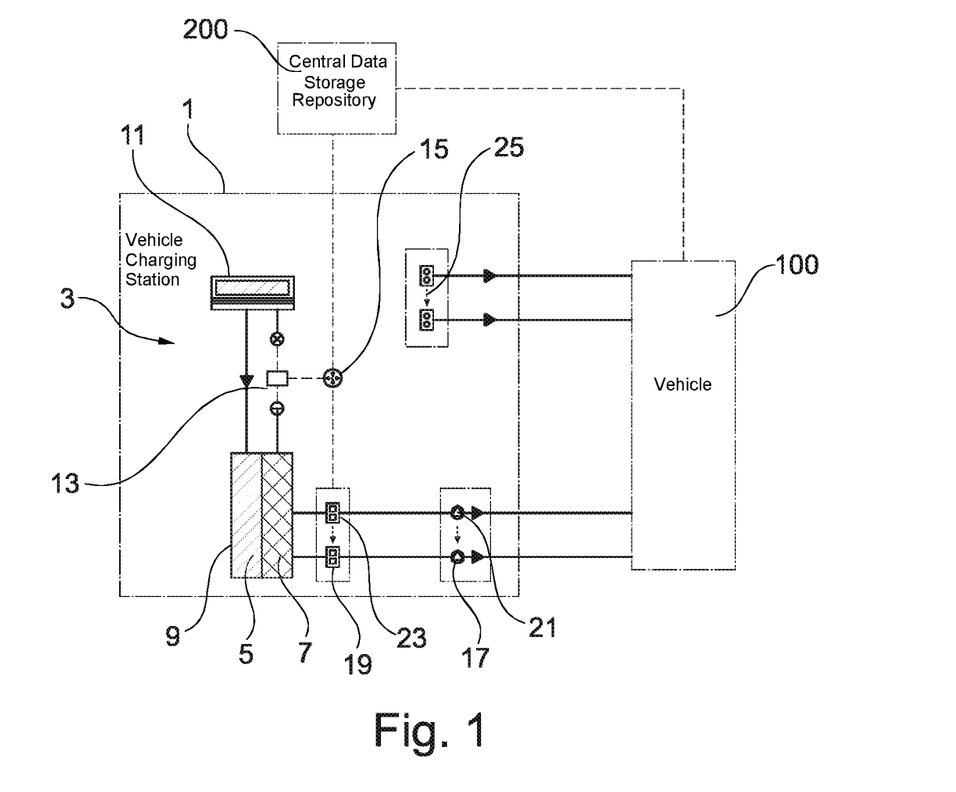
FIG. 1 is a schematic view of a vehicle charging station according to an embodiment of the invention.

Referring principally first to FIG. 1, a vehicle charging station is generally shown at 1. The vehicle charging station 1 has a charging fluid delivery system generally shown at 3. The charging fluid delivery system has a first reservoir 5 and a second reservoir 7. The first 5 and second 7 reservoirs are sealed with respect to one another and are insulated thermally. The first and second 7 reservoirs are contained within a single storage vessel 9 located completely below ground (though in other embodiments it may be partially below or above ground).

The charging fluid delivery system 3 further comprises a thermal energy change system 11 which comprises respective fluid heating and cooling systems. In this case the heating system comprises an electrical heating element and the cooling system comprises an air conditioning unit. Respective conduit circuits, each with flowrate, temperature and pressure measurement sensors and corresponding signal connections to a control system 13, fluidly connect the first reservoir 5 to the electrical heating element and the second reservoir 7 to the air conditioning unit. Respective fluid pumps are provided within these conduit circuits. The fluid pumps in the conduit circuits and the electrical heating element and air conditioning unit each have signal connections to the control system 13. Each of the first 5 and second 7 reservoirs has a temperature sensor and a pressure sensor therein which have respective signal connections to the control system 13. There is also a data connection between the control system 13 and a communication controller (in this case an encryption gateway 15).

The electrical heating element and the air conditioning unit are provided with electrical connections to an electricity distribution grid.

In some embodiments the first 5 and second 7 reservoirs are respectively connected to waste heat and waste cold energy sources.

The first reservoir 5 is connected by a delivery conduit containing a pump 17 and a valve to a hot vehicle connector 19. The hot vehicle connector 19 and first reservoir 5 are also connected by a return conduit. The second reservoir 7 is connected by a conduit containing pump 21 and a valve to a cold vehicle connector 23. The cold vehicle connector 23 and second reservoir 7 are also connected by a return conduit. The hot 19 and cold 23 vehicle connectors have sensors for detection of connection between the respective connector 19, 23 and a vehicle charging station connector. These sensors have a signal connection to the control system 13. The respective pumps and valves in the respective delivery conduits also have signal connections to the control system 13.

The vehicle charging station 1 further comprises an electrical charging system comprising an electrical charging connector 25 connected to the electricity distribution grid.

The control system 13 comprises a processor, a memory, and various input and output devices. The processor operably executes computer readable instructions stored in the memory. In the present embodiment the input devices are terminals for respective wired connections to the encryption gateway 15, each of the temperature, pressure, and flowrate sensors in the first 5 and second 7 reservoirs, and each of the sensors of the hot 19 and cold 23 vehicle connectors. In the present embodiment the output devices are terminals for respective wired connections to the encryption gateway 15, each of the pumps in the conduit circuits, the electrical heating element, the air conditioning unit, each of the valves, the pump 17 in the conduit between the first reservoir 5 and the hot vehicle connector 19, and each of the valve and the pump 21 in the conduit between the second reservoir 7 and the cold vehicle connector 23. Communication between the control system 13 and the other components mentioned is by electrical signal sent via the relevant connection. In other embodiments however the connections may be provided by wireless signal transmission. In some embodiments, where appropriate, the input and output devices may be combined such as by being formed by an I/O unit or interface unit.

Figure 2:
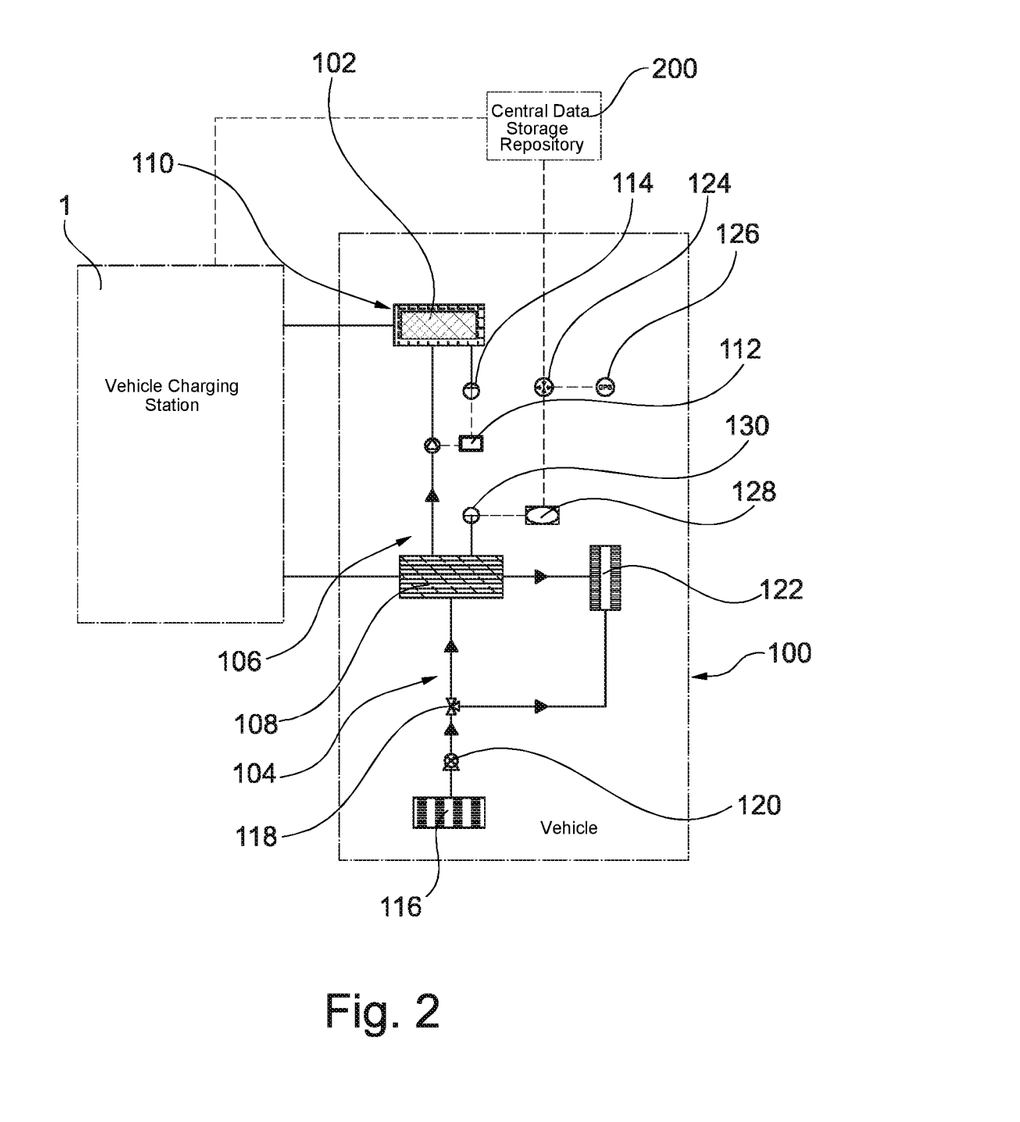
FIG. 2 is a schematic view of a vehicle according to an embodiment of the invention.

Referring principally now to FIG. 2, a vehicle, in this case an electric vehicle, is generally shown at 100. The vehicle comprises a battery pack 102 and a temperature conditioning system generally shown at 104. The vehicle 100 also has a thermal management system generally shown at 106.

The thermal management system 106 has a vehicle thermal energy storage material 108. A fluid flow path, part of which passes through and is defined by the vehicle thermal energy storage material 108, is connected at its ends to a vehicle charging station connector via respective conduits. The vehicle charging station connector has a sensor for detection of connection between the vehicle charging station connector and one of the hot 19 and cold 23 vehicle connectors. This sensor has a signal connection to the control system 112. The part of the fluid flow path passing through the vehicle thermal energy storage material 108 constitutes a heat exchanger.

The thermal management system 106 also comprises a battery temperature control system generally shown at 110. The battery temperature control system 110 comprises a conduit loop including a passage through the vehicle thermal energy storage material 108 and a heat transfer channel surrounding and within the battery pack 102. The conduit loop also incorporates a pump which has a signal connection to a control system 112. A temperature sensor 114 for monitoring the temperature of the battery pack 102 also has a signal connection to the control system 112. The part of the conduit loop passing through the vehicle thermal energy storage material 108 constitutes a heat exchanger.

The temperature conditioning system 104 has an atmospheric air inlet 116 connected by a conduit to an inlet to a three-way valve 118 which has a signal connection to the control system 112. Within this conduit is a fan 120 which also has a signal connection to the control system 112. The three-way valve 118 has two outlets, one connected via a conduit to an inlet of a cabin vent manifold 122 and one connected to an inlet to a heat exchange conduit passing through the vehicle thermal energy storage material 108. An outlet to the heat exchange conduit is connected to an alternative inlet to the cabin vent manifold 122. A cabin of the vehicle has heating, ventilation and cooling controls which have signal connections to the control system 112.

The vehicle 100 comprises a communication controller (in this case an encryption gateway 124). Encryption gateway 124 is connected to a GPS receiver 126 of the vehicle 100 (though in other embodiments additional or alternative positioning systems may be used), to a cabin display controller 128 and to a temperature sensor 130 which monitors the temperature of fluid in the vehicle thermal energy storage material 108. The GPS receiver and cabin display controller have respective data connections to the control system 112 and the temperature sensor 130 has a signal connection to the control system 112.

The vehicle 100 also has a battery charging connector connected to the battery pack 102.

The control system 112 comprises a processor, a memory, and various input and output devices. The processor operably executes computer readable instructions stored in the memory. In the present embodiment the input devices are terminals for respective wired connections to the encryption gateway 124, the cabin controls for heating, ventilation and cooling, the GPS receiver, the temperature sensors 114 and 130 and the sensor of the vehicle charging station connector. In the present embodiment the output devices are terminals for respective wired connections to the encryption gateway 124, the three-way valve 118, the fan 120, the cabin display controller 128 and the pump in the conduit loop of the battery temperature control system 110. Communication between the control system 112 and the other components mentioned is by electrical signal sent via the relevant connection. In other embodiments however the connections may be provided by wireless signal transmission. In some embodiments, where appropriate, the input and output devices may be combined such as by being formed by an I/O unit or interface unit.

A temperature sensor 114 for monitoring the temperature of the battery pack 102 is also connected to the control system 112.

Figure 3:
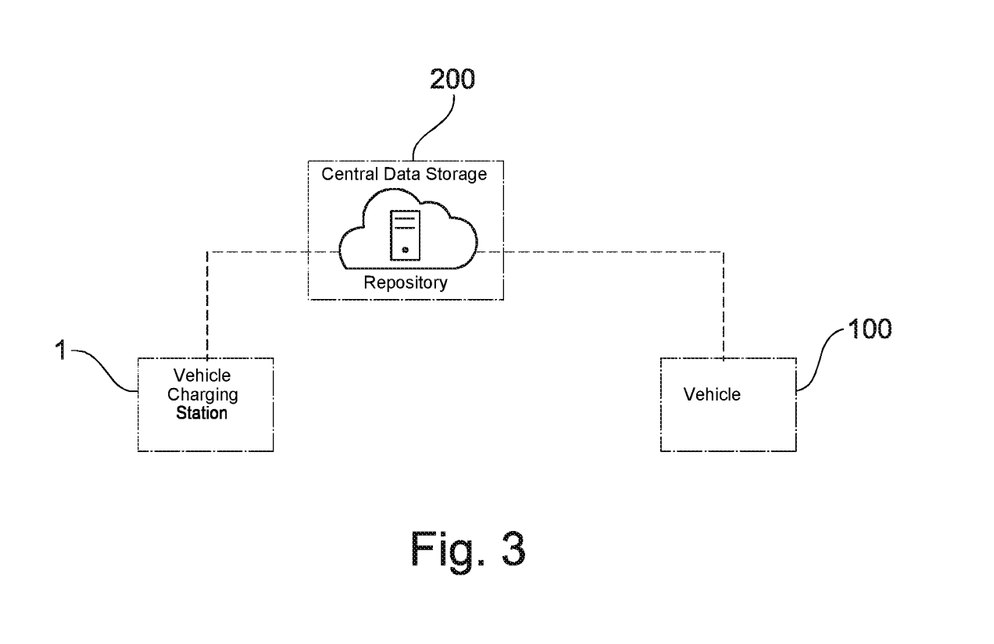
FIG. 3 shows is a schematic view of a central data storage repository according to an embodiment of the invention.

Referring principally now to FIG. 3, a central data storage repository 200 is shown. The central data storage repository is provided by cloud storage to which the encryption gateways and 124 are connected via respective wireless links.

In use, a user of the vehicle 100 may have travelled to the location of the vehicle charging station 1 in order to recharge the vehicle 100. Thereafter the user may connect the vehicle 100 to the vehicle charging station 1. Specifically, the user may connect the electrical charging connector 25 of the vehicle charging station 1 to the battery charging connector of the vehicle 100. Additionally, the user may connect the cold vehicle connector 23 of the vehicle charging station 1 to the vehicle charging station connector of the vehicle 100. The decision to connect the cold vehicle connector 23 (as in this case) rather than the hot vehicle connector 19, may be taken based on the current and/or forecast ambient temperature being relatively high. The cabin display 128, may display the appropriate choice between the hot 19 and cold 23 vehicle connectors based on the requirements/predicted requirements of the thermal management system 106 (though as will be appreciated, alternative notification means may be used). This may guide the user. As will be appreciated, where the ambient temperature is lower, the decision to connect the hot vehicle connector 19 may be taken. Especially in an embodiment where the hot 19 and cold 23 vehicle connectors are combined into a shared connector, the decision as to whether the hot 19 or cold 23 connector is used may be taken automatically (for instance by at least one of the control system 13 or the control system 112).

The connection between the electrical charging connector 25 and the battery charging connector electrically connects the battery pack 102 to the electricity distribution grid, thereby causing charging of the battery pack 102.

The connection between the cold vehicle connector 23 and the vehicle charging station connector allows heat exchange to occur between a second charging fluid of the charging fluid delivery system 3 and the vehicle thermal energy storage material 108 of the thermal management system 106. Specifically, the connection is recognised by the control system 13, which in response opens the valve in the conduit between the second reservoir 7 and the cold vehicle connector 23 and activates the pump 21. This causes the second charging fluid, which is contained within the second reservoir 7, and in the conduits connecting it to the cold vehicle connector 23, to flow in a circuit also incorporating the vehicle charging station connector and the fluid flow path through the vehicle thermal energy storage material 108. This thermally charges the vehicle thermal energy storage material 108, in this case by reducing its temperature.

In accordance with the description above the vehicle may be charged both electrically and thermally, and the charging may occur simultaneously.

Upon completion of a charging cycle the user may disconnect the cold vehicle connector 23 and the vehicle charging station connector. The disconnection is recognised by the control system 13, which in response closes the valve it opened and deactivates the pump 21. The user may also disconnect the electrical charging connector 25, thus breaking the electrical connection between the battery pack 102 and the electricity distribution grid.

As will be appreciated, the process described above with regard to charging the vehicle thermal energy storage material 108 using the second charging fluid, would apply mutatis mutandis to charging the vehicle thermal energy storage material 108 using the first charging fluid sourced from the first reservoir 5.

Following disconnection and upon payment, the user is free to operate the vehicle to travel away from the vehicle charging station 1. In doing so, the vehicle 100 is propelled at least in part by energy delivered by the battery pack 102. During operation of the vehicle, the control system 112 monitors the temperature of the battery pack 102, receiving a signal indicative of the battery temperature via its connection to the temperature sensor 114. Operation of the battery pack 102 is compromised where its temperature is outside of a particular temperature range. In the relatively warm ambient conditions the battery pack 102, especially when under heavier loads, may tend to overheat. Where therefore the control system 112 determines that the battery temperature rises above a predetermined threshold, it operates the battery temperature control system 110. In doing so, it activates the pump in the conduit loop of the battery temperature control system 110. In this way, a vehicle fluid, present in the conduit loop, is circulated from the vehicle thermal energy storage material 108 around the conduit loop, therefore passing through the heat transfer channel surrounding and within the battery pack 102. Thermal energy from the battery pack 102 is therefore transferred to the vehicle fluid and the battery is cooled. As will be appreciated the control system 112 activates and deactivates the pump in the conduit loop of the battery temperature control system 110 as required to maintain the battery temperature within the desirable temperature range.

Whilst operating the vehicle 100, the user may also wish to ventilate and/or alter the temperature within a cabin of the vehicle (e.g., cooling it in view of the relatively high ambient temperature). The user may operate heating, ventilation and cooling controls provided in the cabin. Where the setting of these controls indicates that cooling is required, the temperature conditioning system 104 is operated by the control system 112. Specifically, the three-way valve is configured by the control system 112 to prevent atmospheric air collected via the atmospheric air inlet 116 from flowing directly from the three-way valve to the inlet of the cabin vent manifold 122. Further the three-way valve 118 is configured to allow the collected atmospheric air to flow via the heat exchange conduit passing through the vehicle thermal energy storage material 108 to the alternative inlet to the cabin vent manifold 122. The control system 112 may also operate the fan 120 to increase the flow of atmospheric air depending on the settings of the cabin controls. In this way, ambient air cooled by heat exchange with the vehicle thermal energy storage material 108 is provided to the cabin. Where the settings of the cabin controls indicate that no cooling, but simple ventilation, is required, the control system 112 operates the three-way valve 118 to bypass atmospheric air heat exchange with the vehicle thermal energy storage material 108. Specifically, the three-way valve is configured by the control system 112 to prevent atmospheric air collected via the atmospheric air inlet 116 from flowing from the three-way valve, via the heat exchange conduit passing through the vehicle thermal energy storage material 108 to the alternative inlet to the cabin vent manifold 122. Further the three-way valve is configured to permit the flow of collected atmospheric air to flow directly from the three-way valve to the inlet of the cabin vent manifold 122.

By using the thermal energy stored in the vehicle thermal energy storage material 108 to provide cooling for the battery and cabin, electrical power from the battery, which might otherwise be used for these purposes, may be saved, thereby potentially extending the range and/or improving the performance of the vehicle 100.

The control system 112 of the vehicle 100 also receives one or more operation parameters for vehicle charging stations that have been uploaded by those vehicle charging stations to the central data storage repository 200. The operation parameters are received by the control system 112 via wireless link between the central data storage repository 200 and the encryption gateway 124. The control system 112 uses the operation parameters concerning the vehicle charging stations in combination with information concerning the location of the vehicle provided by the GPS receiver 126 and the temperature of the vehicle thermal energy storage material 108 provided by the temperature sensor 130, to recommend one or more vehicle charging stations for use by the user of the vehicle 100. Navigation routes to one or more of the charging stations may also be provided by the control system 112 to the user via the cabin display controller 128.

In some embodiments the control system 112 may additionally or alternatively provide operation parameters (e.g., the location of the vehicle 100 and/or the status of its vehicle thermal energy storage material 108 (e.g., its temperature)) to the central data storage repository 200. Data signals indicative of the location of the vehicle 100 could be sent from the GPS receiver 126 to the control system 112, which might send them to the central data storage repository 200 via the encryption gateway 124 and a wireless connection. Similarly, data signals indicative of the temperature of the vehicle thermal energy storage material 108 could be sent from the temperature sensor 130 to the control system 112, which might send them to the central data storage repository 200. Operation parameters such as these may be useful (e.g., for a control system of a vehicle charging station) in determining expected charging load at a particular vehicle charging station. This may be particularly true where they are considered alongside similar parameters for other vehicles. This information in turn may be used to influence the vehicle charging station(s) recommended to a user (e.g., particular vehicle charging stations may be avoided where they are or are likely to be experiencing high demand and/or are low on reserves of thermal energy).

Returning to further describe operation of the vehicle charging station 1, the thermal energy change system 11 is arranged to periodically heat the first charging fluid and cool the second charging fluid. The control system 13 monitors the temperature of the first charging fluid in the first reservoir 5 and the temperature of the second charging fluid in the second reservoir 7 via data signals sent from the respective temperature sensors in the reservoirs 5 and 7.

During times of day where electricity is available at off-peak prices, and where the temperature of the first charging fluid drops below a predetermined threshold, the control system 13 activates the fluid pump in the relevant conduit circuit so that the first charging fluid is circulated through the electrical heating element which the control system 13 also activates. The electrical heating element draws power from the electricity distribution grid, though in other embodiments it may utilise thermal energy from another source (e.g., waste heat from an industrial process or renewable sources). As will be appreciated the control system 13 activates and deactivates the fluid pump and electrical heating element as necessary in order to maintain the temperature of the first charging fluid within a predetermined band of temperatures during off-peak electricity hours. The control system 13 will, under particular circumstances, also cause heating of the first charging fluid in a similar manner even at times where electricity is not available at off-peak prices. Such circumstances may arise where the temperature of the first charging fluid has been reduced to a particular minimum threshold and/or in anticipation of a particular level of charging demand for the first charging fluid. In the latter case information on expected charging demand may be determined based on operation parameters concerning one or more other devices (e.g., vehicle charging stations and/or vehicles) retrieved from the central data storage repository by the control system 13 via the encryption gateway 15.

During times of day where electricity is available at off-peak prices, and where the temperature of the second charging fluid rises above a predetermined threshold, the control system 13 activates the fluid pump in the relevant conduit circuit so that the second charging fluid is circulated through the air conditioning unit which the control system 13 also activates. The air conditioning unit draws power from the electricity distribution grid, though in other embodiments it may utilise thermal energy from another source (e.g., waste cold from vaporisation of liquefied natural gas). As will be appreciated the control system 13 activates and deactivates the fluid pump and air conditioning unit as necessary in order to maintain the temperature of the second charging fluid within a predetermined band of temperatures during off-peak electricity hours. The control system 13 will, under particular circumstances, also cause cooling of the second charging fluid in a similar manner even at times where electricity is not available at off-peak prices. Such circumstances may arise where the temperature of the second charging fluid has been raised to a particular maximum threshold and/or in anticipation of a particular level of charging demand for the second charging fluid. In the latter case information on expected charging demand may be determined based on operation parameters concerning one or more other devices (e.g., vehicle charging stations and/or vehicles) retrieved from the central data storage repository by the control system 13 via the encryption gateway The process described above gives rise to stores of charging fluid at temperatures above and below ambient, preferentially heated or cooled as necessary using off-peak electricity and then stored for delivery as thermal energy to vehicles as required.

Under particular conditions, operation of the thermal energy change system as described above may be overridden. By way of example, during off-peak electricity times of day, the control system may alter and/or maintain at least one of the temperature, phase, or chemistry of one or other of the first and second charging fluids so as the store of thermal energy is somewhat reduced or increased by comparison with that achieved by following the methodology described above. This may be appropriate where, for example, anticipated load indicates that below or above average thermal energy will likely be required. The anticipated loads may be calculated by the control system 13 in dependence on operation parameters concerning one or more other devices (e.g., vehicle charging stations and/or vehicles) retrieved from the central data storage repository by the control system 13 via the encryption gateway 15. By way of further example, the control system 13 may not at least one of alter or maintain at least one of the temperature, phase, or chemistry of one or other of the first and second charging fluids, instead allowing it to normalise to ambient temperature. This may be appropriate where there is no anticipated need for that charging fluid (i.e., no need for charging fluid either above or below ambient temperature). This might for example occur where the season and typical ambient temperatures indicate that only one or other of the charging fluids will likely be required for an extended period. Furthermore, in some embodiments it may be that one or other of the first 5 and second 7 reservoirs, with associated systems and charging fluid, is omitted altogether.

In some embodiments the control system 13 may additionally or alternatively provide operation parameters (e.g., current and/or expected charging load and/or remaining thermal energy stored in one other or both of the first and second charging fluids) to the central data storage repository 200. Data signals indicative of such operation parameters could be sent from the control system 13 to the central data storage repository 200 via the encryption gateway 124 and a wireless connection.

Figure 4:
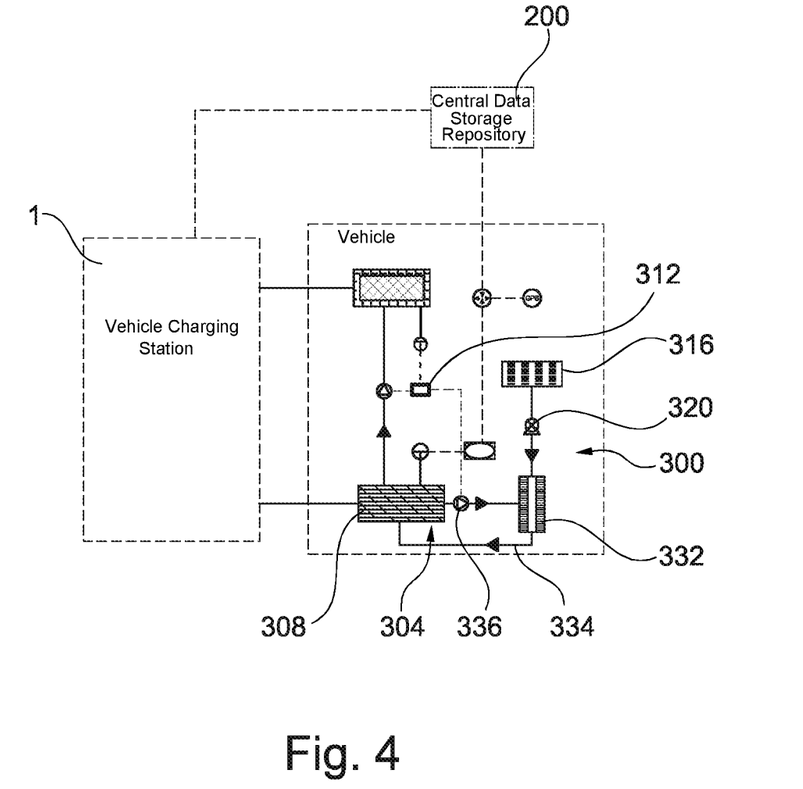
FIG. 4 is a schematic view of a vehicle according to another embodiment of the invention.

Referring now to FIG. 4, an alternative vehicle 300 embodiment is shown by comparison with that discussed with reference to FIG. 4. The vehicle 300 is similar to that of FIG. 2 and like features are provided with the same reference numerals in the series 300. The vehicle 300 differs from the vehicle 100 in that rather than atmospheric air collected via the atmospheric air inlet 116 being alternately deliverable directly to the cabin vent manifold 122 or indirectly to it via the heat exchange conduit passing through the vehicle thermal energy storage material 108, heat exchange between collected atmospheric air and vehicle fluid occurs in a heat exchanger associated with the cabin vent manifold. Thus, in the FIG. 4 embodiment, a temperature conditioning system 304 has an atmospheric air inlet 316 connected by a conduit to an air inlet of a heat exchanger (not shown) of a cabin vent manifold 332. Within this conduit is a fan 320 which has signal connection to a control system 312. The heat exchanger provides heat exchange between the atmospheric air entering via its air inlet and vehicle fluid, the heat exchanger forming part of a cabin cooling loop 334 around which the vehicle fluid travels from and back to a vehicle thermal energy storage material 308. The cabin conduit loop 334 incorporates a cabin loop pump 336, which has a signal connection to the control system 312. The cabin vent manifold also has a condensed water outlet (not shown). A cabin of the vehicle has heating, ventilation and cooling controls which have signal connections to the control system 312. The remaining features of the vehicle 300 are similar to those of vehicle 100.

Whilst operating the vehicle 300, the user may wish to ventilate and/or alter the temperature within a cabin of the vehicle (e.g., cooling it in view of the relatively high ambient temperature). The user may operate heating, ventilation and cooling controls provided in the cabin. Where the setting of these controls indicates that cooling is required, the temperature conditioning system 304 is operated by the control system 312. Specifically, the cabin loop pump 336 in the cabin conduit loop 334 is activated, and the vehicle fluid, present in the cabin conduit loop 334, is circulated from the vehicle thermal energy storage material 308 around the cabin conduit loop 334. The vehicle fluid thus passes into heat exchange with atmospheric air collected via the atmospheric air inlet 316 in the heat exchanger of the cabin vent manifold 332. The control system variably controls the speed of the cabin loop pump to adjust the degree of heat exchange of the vehicle fluid with the ambient air in the heat exchanger. The control system 312 may also operate the fan 320 to increase the flow of atmospheric air in dependence on the settings of the cabin controls. In this way, ambient air cooled by heat exchange with the vehicle fluid is provided to the cabin. Where the settings of the cabin controls indicate that no cooling, but simple ventilation is required, the cabin loop pump 336 is deactivated, and the collected ambient air will be provided to the cabin without significant heat exchange. As will be appreciated, the control system 312 controls the cabin loop pump 336 in the conduit loop of the temperature conditioning system 304 as required to maintain the cabin temperature in accordance with the heating, ventilation, and cooling control settings. Particularly in humid conditions, moisture from the ambient air may condense in the heat exchanger. The condensed water outlet allows the condensed water to flow out of the heat exchanger.

The vehicle 300 may offer benefits in terms of reduced complexity of the system to ventilate and/or alter the temperature of the cabin.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device, or integrated circuits or on an optically or magnetically readable medium such as, for example, a CD, DVD, magnetic disk, or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine-readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent, or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims. By way of example, in some embodiments the thermal energy change system is arranged to selectively convert thermal energy from one, other or both of the first and second charging fluids to electrical energy. This may be appropriate where the relevant charging fluid has thermal energy which is not required for vehicle charging. By way of additional example, in some embodiments the vehicle charging station is arranged to recover thermal energy produced by use of a transformer and at least one of maintain or adjust at least one of the temperature, phase, or chemistry of the first and/or second charging fluid using the recovered thermal energy.

The invention claimed is:

1. A vehicle charging station comprising a first reservoir arranged to contain a first charging fluid and a charging fluid delivery system arranged to deliver at least part of the first charging fluid into a heat exchange relationship with a vehicle thermal energy storage material of a vehicle selectively connected to the vehicle charging station, thereby charging the vehicle thermal energy storage material by changing at least one of its temperature, phase, or chemistry such that upon disconnection, a vehicle fluid is selectively circulatable around a loop from the vehicle thermal energy storage material to one or more vehicle systems.

2. A vehicle charging station according to claim 1 comprising a thermal energy change system arranged to at least one of alter or maintain at least one of the temperature, phase, or chemistry of the first charging fluid in at least one of the first reservoir or elsewhere in the vehicle charging station, where the thermal energy change system comprises at least one of a heating or cooling system.

3. A vehicle charging station according to claim 2 where the thermal energy change system is arranged to receive the electrical energy from a power grid.

4. A vehicle charging station according to claim 2 where the thermal energy change system is arranged to deliver thermal energy to the first charging fluid where the thermal energy is provided by at least one of the surroundings, by waste thermal energy from one or more processes, or from renewable sources.

5. A vehicle charging station according to claim 2 comprising a control system arranged to control the thermal energy change system to at least one of maintain or adjust at least one of the temperature, phase, or chemistry of the first charging fluid.

6. A vehicle charging station according to claim 5 where the control system is arranged to control the thermal energy change system to at least one of maintain or adjust at least of the temperature, or phase, or chemistry of the first charging fluid in dependence on one or more operation parameters.

7. A vehicle charging station according to claim 6 where the control system exclusively or preferentially at least one of maintains or alters at least one of the temperature, or phase, or chemistry of the first charging fluid during times of day where electricity is cheaper.

8. A vehicle charging station according to claim 1 where the first reservoir comprises a storage vessel located at least partially below ground.

9. A vehicle charging station according to claim 1 comprising an electrical charging system arranged to deliver electrical energy to a vehicle electrical system.

10. A vehicle charging station according to claim 1 comprising a communication controller arranged to communicate directly or indirectly via one or more wired or wireless networks with one or more devices remote from the vehicle charging station.

11. A vehicle charging station according to claim 10 arranged to send one or more operation parameters concerning the vehicle charging station to the one or more devices via the one or more wired or wireless networks.

12. A vehicle charging station according to claim 1 comprising a second reservoir arranged to contain a second charging fluid, whereby the first and second charging fluids are maintained at least one of substantially different temperatures, phases, or chemistry and where the charging fluid delivery system is arranged to allow selection between delivery of the first and second charging fluids into heat exchange relationship with the vehicle thermal energy storage material.

13. A vehicle comprising a thermal management system, the thermal management system comprising a vehicle thermal energy storage material and being arranged to place the vehicle thermal energy storage material and a first charging fluid of a vehicle charging station selectively connected with the vehicle into a heat exchange relationship with each other, the first charging fluid thereby charging the vehicle thermal energy storage material by changing at least one of its temperature, phase, or chemistry and where the thermal management system further comprises a loop from the vehicle thermal energy storage material to one or more vehicle systems arranged to circulate a vehicle fluid upon disconnection.

14. A vehicle according to claim 13 where the thermal management system is arranged to provide for thermal energy transfer between the vehicle thermal energy storage material and a battery temperature control system arranged to maintain the temperature of a battery pack of the vehicle within a temperature tolerance range using thermal energy transfer with the vehicle thermal energy storage material.

15. A vehicle according to claim 13 where the battery pack is arranged to deliver energy to propel the vehicle.

16. A vehicle according to claim 13 where the thermal management system is arranged to provide for thermal energy transfer between the vehicle thermal energy storage material and a temperature conditioning system arranged to selectively deliver at least one of heating or cooling to a cabin of the vehicle using thermal energy transfer with the vehicle thermal energy storage material.

17. A vehicle according to claim 13 where the thermal management system is arranged to place the vehicle thermal energy storage material and a second charging fluid of the vehicle charging station to which the vehicle is selectively connected into a heat exchange relationship with each other, the second charging fluid thereby charging the vehicle thermal energy storage material by changing at least one of its temperature, or phase, or chemistry.

18. A vehicle according to claim 13 where the vehicle comprises a communication controller arranged to communicate directly or indirectly via one or more wired or wireless networks with one or more devices remote from the vehicle.

19. A vehicle according to claim 18 where the communication controller is arranged to at least one of send one or more operation parameters concerning the vehicle to the one or more devices via the one or more wired or wireless networks or receive one or more operation parameters concerning one or more vehicle charging stations from the one or more devices, via one or more wired or wireless networks.

20. A vehicle charging method comprising charging a vehicle thermal energy storage material of a vehicle selectively connected to a vehicle charging station by delivering at least part of a first charging fluid contained in the vehicle charging station into a heat exchange relationship with the vehicle thermal energy storage material, thereby changing at least one of the temperature, phase, or chemistry of the vehicle thermal energy storage material disconnecting and selectively circulating a vehicle fluid around a loop from the vehicle thermal energy storage material to one or more vehicle systems.

\* \* \* \* \*